United States Patent [19]
Wilhelmson

[11] 4,263,501
[45] Apr. 21, 1981

[54] VARIABLE PROPORTIONING CONTROL APPARATUS

[75] Inventor: Jack L. Wilhelmson, Cheraw, S.C.

[73] Assignee: Lab-Line Instruments Inc., Melrose Park, Ill.

[21] Appl. No.: 9,548

[22] Filed: Feb. 5, 1979

[51] Int. Cl.³ .................... B23K 1/02; G05D 23/00
[52] U.S. Cl. .................................. 219/497; 219/498; 318/599
[58] Field of Search ............... 219/490, 494, 497, 498, 219/499, 501; 318/484, 599, 341; 236/3, 91 R

[56] References Cited

U.S. PATENT DOCUMENTS

| | | | |
|---|---|---|---|
| 3,436,629 | 4/1969 | Adler | 318/599 |
| 3,584,291 | 6/1971 | Budniak | 219/494 |
| 3,612,975 | 10/1971 | Keefe | 318/599 |
| 3,814,902 | 6/1974 | Fann | 219/497 |
| 3,842,243 | 10/1974 | Gregory | 219/497 |
| 4,056,708 | 10/1977 | Soodak et al. | 219/497 |

FOREIGN PATENT DOCUMENTS 2708552  8/1978  Fed. Rep. of Germany ........... 219/497

*Primary Examiner*—Richard R. Kucia
*Assistant Examiner*—Mark Paschall
*Attorney, Agent, or Firm*—Vogel, Dithmar, Stotland, Stratman & Levy

[57] ABSTRACT

The apparatus may be used to control heater elements for an over chamber. The heater elements are operated in accordance with the output of a comparator having on one input a voltage representative of the temperature in a chamber. The voltage on the other input is established in accordance with the desired or ultimate temperature in the chamber. As long as the volage on the second-mentioned input is greater than the voltage on the other input, the heater elements will be energized to heat the chamber. The voltage on the second-mentioned input is modulated with a triangular wave so that the heater elements are operated intermittently as the desired temperature of the chamber is approached. The amplitude of the triangular wave varies with the desired temperature so that at higher and higher oven temperatures, the heater elements start to become intermittent at higher and higher temperatures.

13 Claims, 1 Drawing Figure

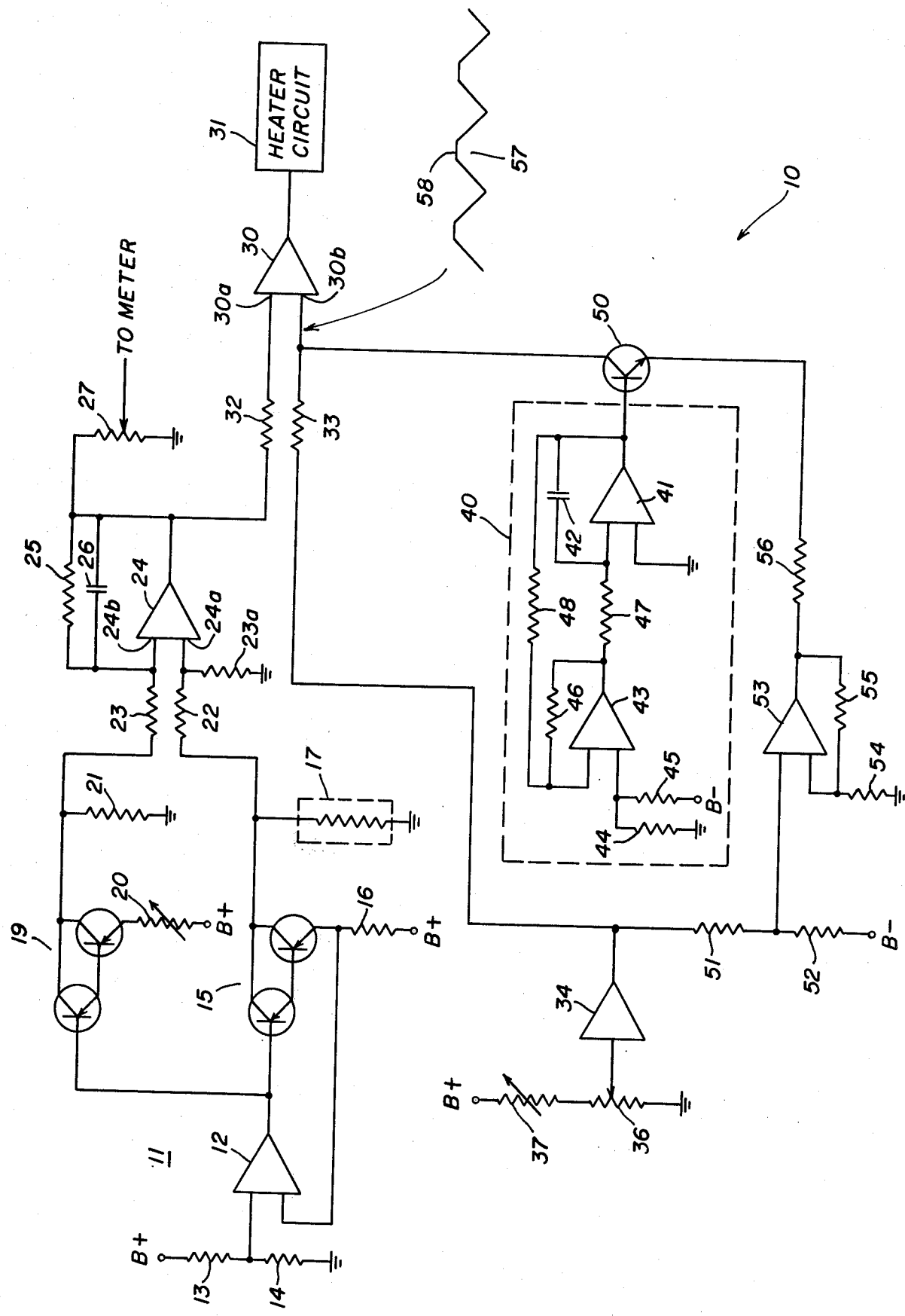

VARIABLE PROPORTIONING CONTROL APPARATUS

BACKGROUND OF THE INVENTION

Ovens used in laboratories and/or as incubators must have carefully maintained temperature control. It is also important to be able to arrive at a selected temperature as quickly as possible. Obviously, the greater the power output of the heater elements used in such ovens, the greater the heat that can be delivered to the oven chamber and the faster the ultimate temperature can be reached. If the heater elements are de-energized precisely at the desired temperature, the heater elements remain hot as do the walls of the oven chamber. The temperature of the chamber continues to increase despite the heater elements having been de-energized. This phenomenon is commonly referred to as "overshoot". For example, if a particular oven has an operating range of 0°–300° C., and the desired temperature is 150° C., de-energization of the heater elements at such temperature will result in the temperature increasing well beyond 150° C. The heat from the heater elements will finally dissipate and the temperature of the chamber will drop to a temperature below 150° C., whereupon the heater elements are automatically energized to deliver more heat. Ultimately, the oven temperature will reach a substantially quiescent state at 150° C. It can be appreciated, however, that the time to arrive at this condition would be excessive, without some temperature control circuit.

In the past, heater control circuits have automatically maintained the heater elements fully on up to some predetermined temperature less than the desired temperature. When such predetermined temperature was reached, these circits de-energized the heater elements for a duration each cycle, which duration increased as the ultimate temperature was neared; in other words the interruptions become longer and longer. At the desired temperature, no power was supplied to the heater elements and they were theoretically cool. For example, a 150° ultimate temperature may be attained by energizing the heater elements intermittently beginning at, say, 140°. At the temperature the heater elements would be energized during, for example, 90% of each cycle and during the remaining 10%, they would be de-energized. As the temperature continued to rise, the period of energization during each cycle would steadily decrease, so that by the time the temperature reached say 148°, the heater elements were only operated 20% of each cycle. Basically, such temperature control was furnished by modulating a triangular wave onto a voltage established by the setting of the desired temperature in the chamber. Such circuits are disclosed in U.S. Pat. No. 3,842,243 to Gregory and U.S. Pat. No. 3,584,291 to Budniak.

The problem with these prior art circuits is that the amount of temperature control of proportioning, as it is called, is fixed. In the foregoing example, it was assumed that the circuit design caused intermittent operation of the heater elements to start at 140° when the desired temperature was 150°. That fixed the starting point at 10° less than the ultimate temperature throughout the entire temperature range. At a desired temperature of 200°, intermittent operation of the heater elements would start at 190°. At 300°, the intermittent operation would start at 290°, and so forth.

With such fixed proportioning, the heater elements started intermittent operation too high at lower temperatures, and too low at higher temperatures. As a result intermittent operation is not sufficient to prevent overshoot at lower temperatures. In such case, the oven temperature began to fall after it reached its maximum, ultimately setting at the desired temperature. However, such performance was undesirably time-consuming. In the above example, the control circuit was set at the factory so that, when the desired temperature was 150°, the heater elements began operating intermittently at 140°. If a temperature of 100° was selected, then intermittent operation would start at 90°. The temperature might increase to 102° or 103°, and then oscillate to the desired temperature.

In the same vein, for desired temperatures above the temperature for which the control circuit was set at the factory, the desired temperature was either never reached (commonly called "droop") or reached only after an excessively long time.

The same comments made above with respect to temperature in an oven chamber are also applicable to other characteristics of the gas in the chamber. For example, it may be desirable to control the level of a particular ingredient in the gas such as carbon dioxide or its relative humidity.

SUMMARY OF THE INVENTION

It is therefore an important object of the present invention to provide control apparatus which controls the magnitude of a given characteristic of gas in a chamber in which overshoot and droop are minimized.

Another object of the present invention is to provide variable proportioning control apparatus in which the possibility of overshoot and/or droop throughout the temperature range of the oven is minimized.

Another object is to provide variable proportioning control apparatus with variable proportioning to reduce overshoot and droop throughout the temperature range of the oven with which the apparatus is used.

Another object is to provide variable proportioning control apparatus in which the starting temperature of intermittent operation of the heater elements commences at a variable temperature less than the desired temperature, dependent on the setting of the desired temperature.

In summary, there is provided variable proportioning control apparatus for controlling a device which establishes the magnitude of a given characteristic of gas in a chamber, comprising a comparator having an output for operating the device and having first and second inputs, first means for providing a first electrical signal representative of the actual magnitude of the given characteristic of the gas in the chamber and being coupled to the first input, second means for providing a second electrical signal representative of the desired magnitude of the given characteristic of the gas in the chamber and being coupled to the second input, third means for modulating the second electrical signal with a triangular wave, and fourth means for varying the amplitude of the triangular wave in accordance with the desired magnitude of the given characteristic of the gas in the chamber.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages, of the invention.

BRIEF DESCRIPTION OF THE DRAWING

For the purposes of facilitating an understanding of the invention, there is illustrated in the accompanying drawing, a preferred embodiment thereof, from an inspection of which, when considered in connection with the following description, the invention, its construction, and operation, and many of its advantages should be readily understood and appreciated.

The sole FIGURE is a circuit diagram partially in block and partially schematic illustrating a heater control apparatus incorporating the features of the present invention.

DESCRIPTION OF THE PREFERRED EMBODIMENT

Referring now to the drawing, there is depicted heater control apparatus 10 which comprises a dual-tracking current source 11, in turn including an operational amplifier 12 having one input coupled to the junction between a pair of resistors 13 and 14 connected in series between the B+ supply voltage and ground. The output of the amplifier 12 is coupled to a pair of PNP transistors connected as a Darlington pair 15, the emitter of the second transistor of which is coupled through a resistor 16 to the B+ supply voltage and also back to the second input of the amplifier 12. The output of the Darlington pair 15 is connected to one terminal of a temperature sensor 17, the other terminal of which is connected to ground. The resistance of the sensor 17 varies with temperature. It is physically located in the chamber (not shown) which is to be heated. In an operational form of the apparatus 10, the sensor 17 was a platinum probe having a resistance of 100 ohms at 0° C.; its resistance increased 0.35 ohm for each degree increase in temperature. The Darlington pair 15 delivers a constant current to the sensor 17 irrespective of its resistance. Accordingly, the voltage across the sensor 17 increases linearly with the temperature in the chamber.

The other half of the dual-tracking current source 11 includes a second Darlington pair 19, also defined by a pair of PNP transistors. A potentiometer 20 is connected between the emitter of the second transistor in the pair 19 and the B+ supply voltage, while a load resistor 21 is connected between the collectors of the Darlington pair 19 and ground. The value of the resistor 21 is the same as the resistance of the sensor 17 at 0° C. In other words, in the example described, the resistor 21 has a resistance of 100 ohms.

The outputs from the two halves of the dual-tracking current source 11 are respectively coupled through resistors 22 and 23 to the inputs 24a and 24b of a differential amplifier or comparator 24. A resistor 23a is coupled from the input 24a to ground. The comparator 24 has feedback in the form of a resistor 25 and a capacitor 26, connected in parallel between the output and the input 24b. Thus, the comparator 24 will produce a voltage proportional to the amount by which the voltage at the input 24a exceeds the voltage at the input 24b. At 0° C., the voltage at the two inputs is the same and, therefore, the output is zero. As the temperature of the chamber increases, the resistance of the sensor 17 increases so that the voltage at the input 24a exceeds the voltage at the input 24b. The voltage at the output of the comparator 24 is directly and linearly proportional to the temperature in the oven chamber. The greater the temperature in the chamber, therefore, the greater the voltage produced by the comparator 24. In an operative form of the invention, in an oven designed to operate between 0° and 300° C., the output of the comparator 24 produced six millivolts for every degree centigrade. Thus, the comparator 24 produced 0.6 volts when the temperature of the chamber was 100° C.

The dual-tracking current source 11 cancels the effect of variations in supply voltage, parts values, transistor conduction, etc. The potentiometer 20 is adjusted so that the voltages at the inputs 24a and 24b respectively are identical at 0° C.; in other words, the output of the comparator 24 is zero at 0° C.

The movable tap of the potentiometer 27 is connected to a meter which may be digital or analog and may have printing capability. The potentiometer 27 is factory set to match the meter sensitivity so that the meter may be read directly in degrees centigrade.

The heater control apparatus 10 further comprises a comparator 30 having an input 30a, an input 30b and an output connected to a heater circuit 31. The comparator 30 is connected to produce a low voltage or "0", as it is commonly characterized, when the voltage on the input 30a is equal to or greater than the voltage on the input 30b. The output of the comparator 30 becomes high, or is a "1", as long as the voltage on the input 30b exceeds the voltage on the input 30a. The heater circuit 31 supplies power to the heater elements (not shown) in the oven chamber (not shown) whenever its input is high or is "1". Thus, as long as the voltage on the input 30b exceeds the voltage on the input 30a, the heater elements receive power and operate to increase the temperature of the oven chamber. When the voltage on the input 30b equals the voltage on the input 30a, the heater elements are disabled, although the residual heat in the elements continues to raise the temperature of the chamber.

The output of the comparator 24 is coupled to the input 30a of the comparator 30 by way of a resistor 32. The input 30b receives voltage by way of a resistor 33 in turn coupled to an amplifier 34 having its input coupled to the movable arm of a potentiometer 36. A second potentiometer 37 is connected in series with the potentiometer 36 between the B+ supply voltage and ground. The potentiometer 37 is for calibration purposes. The potentiometer 36 is accessible to the user and is adjustable to set the desired temperature of the chamber. It is associated with means to display the temperature selected, which display may be analog or digital. The operational amplifier 34 acts as a source follower to lower the impedance of the voltage selected on the potentiometer 36. In a particular example, the voltage at the output of the amplifier 34 increased 6 millivolts for every degree of setting. Thus, if the user selected a temperature of 100°, the output of the amplifier 34 would be 0.6 volts.

Preferably the inputs 30a and 30b of the comparator 30 follow the same temperature/voltage characteristics. In this case, for every degree of desired temperature, the input 30b is 6 millivolts, and for every degree of temperature in the oven chamber, 6 millivolts will be applied to the input 30a. Then, a 150° setting on the potentiometer 36 would cause 0.9 volts to be applied to the input 30b. The voltage at the input 30a would be zero initially. Since the voltage on the input 30b exceeds the voltage on the input 30a, the output of the comparator 30 would be high and the heater elements in the oven chamber would be energized. This causes the temperature in the chamber to increase, thereby increasing the voltage across the sensor 17 and thus the voltage at the input 30a. When the oven temperature reaches 150° C., in the example, the voltage to the input 30a would be 0.9 volts, the same as the voltage to the input 30b and the output of the comparator 30 would become low, thereby de-energizing the heater elements. If no additional temperature control circuitry is used, the residual heat in the heating elements will cause the temperature of the chamber undesirably to continue to increase, even though the elements have been de-energized.

To prevent this, the voltage on the input 30b is modulated by a triangular wave produced by a constant-amplitude-triangular-wave generator 40. The generator 40 includes an integrator portion defined by an operational amplifier 41 and a capacitor 42 providing feedback. Also included in the generator 40 is a threshold detector including a comparator 43. The voltage input at one of the inputs of the comparator 43 is established by a divider including resistors 44 and 45 connected in series between the B− supply voltage and ground. A feedback resistor 46 is connected between the output of the comparator 43 and the second input thereto. The output of the comparator 43 is coupled by way of a resistor 47 to the nongrounded input of the amplifier 41. There is also provided a feedback resistor 48 connected between the output of the amplifier 41 and the signal input of the comparator 43. The integrator defined by the amplifier 41 and the capacitor 42 is employed as a ramp generator and the comparator 43 as a reset circuit. The frequency of the triangular wave is determined by the values of the resistor 47 and capacitor 42. The amplitude of the wave is determined by the ratio of the resistor 48 to the resistor 46 and the threshold detector saturation voltages. The bias on the comparator 43 is set to have equal positive and negative saturation voltages, so that the positive and negative ramp rates are equal and the resultant wave is an isosceles triangle. The capacitor 42 can thus have a much lower value.

The frequency of the triangular wave is preferably less than one-half the line frequency which powers the power supply (not shown) that produces the B− and B+ supply voltages. With a 60 Hz line voltage, the frequency of the triangular wave should be less than 30 Hz. A preferred frequency is 10 Hz.

The triangular wave is applied to the base of an NPN transistor 50, the collector of which is connected to the input 30b of the comparator 30. The emitter of the transistor 50 is supplied by a voltage which varies in accordance with the setting of the potentiometer 36. To this end, the output of the amplifier 34 is also connected to a pair of resistors 51 and 52 connected in series to the B− supply voltage. The junction of the resistors 51 and 52 is connected to one input of an operational amplifier 53 biased by means of a resistor 54 connected from the other input to ground and having negative feedback in the form of resistor 55. The output of the operational amplifier 53 is connected through a resistor 56 to the emitter of the transistor 50. The voltage applied to the emitter of the transistor 50 varies in accordance with the setting of the potentiometer 36. As the voltage is increased to raise the desired temperature of the oven chamber, the voltage applied to the emitter of the transistor 50 is also increased. The manner and extent to which the emitter voltage follows the voltage of the output of the amplifier 34 is determined by the values of the resistors 51, 52 and 54–56. The wave produced by the triangular wave generator 40 is modulated onto the DC voltage directly furnished by the amplifier 34. Thus, a wave form 57 is produced on the input 30b of the comparator 30.

The negative peaks of the wave produced by the generator 40 are sufficiently great to cut off the transistor 50 during part of each cycle so that the wave form 57 produced on the collector of the transistor 50 has its positive peaks truncated at 58. The DC level of the truncated peaks 58 of the wave form 57 is the DC voltage furnished by the amplifier 34. Following through on the example previously started, if a temperature of 100° is selected, the amplifier 34 would furnish a DC voltage of about 0.6 volts and, therefore, the truncated peaks 58 would occur at +0.6 volts. At 200°, where the amplifier 34 produces a DC voltage of +1.2 volts, the level of the peaks 58 would be +1.2 volts.

Suppose the desired temperature was 150°, in which case the triangular wave form 57 of the input 30b would have its truncated peaks at a level of +0.9 volts. Initially, the oven chamber is at, say, room temperature (22° C.) whereby the voltage at the other input 30a will be 0.13 volts, so that the heater circuit 31 will be enabled and the heater elements will be energized to begin heating the oven chamber. The heater elements will remain fully on until the voltage on the input 30a increases to the value of the negative peaks of the wave form 57. For a portion of each cycle, the voltage on the input 30a will exceed the voltage on the input 30b, thereby turning off the heater elements. However, the residual heat remaining in these elements and the walls continues to heat the chamber so that the temperature continues to rise. Because of the triangular shape of the wave form 57, the heating elements will be de-energized for longer and longer periods until the voltage on the input 30a finally reaches 0.9 volts in this example, which is the voltage level of the truncated peaks 58.

The fact that the wave form 57 is truncated insures that the heater elements will be on for at least some minimum predetermined duration. If the wave was not truncated, then the heater elements would be rapidly turned on and off as the apex was reached.

The greater the desired temperature, the greater the voltage produced on the output of the amplifier 34 and the greater the emitter voltage of the transistor 50. The greater the emitter voltage on the transistor 50, the smaller the peak-to-peak amplitude of the wave form 57. In fact, at the extreme end of the range, the amplitude of the wave form 57 is zero. For example, in a 0°–300° oven, at a setting of 300°, the voltage on the input 30b would be constant at slightly less than 1.8 volts. In other words, the heater elements will be operated continuously in order to enable the chamber to remain at its maximum temperature of 300°.

By changing the amplitude of the wave form 57 with the temperature setting, the starting point of intermittent operation of the heater elements can be controlled. At the lowest temperatures, it is desirable to start intermittent operation early so that overshoot does not occur. At the high end of the range, it is desirable to start intermittent operation at levels very near the desired. In fact, at the maximum temperature, as just explained, the heaters do not operate intermittently at all. As an example, intermittent operation for a 0°–300° oven for a setting of 100° could start at 91° while intermittent operation for a 200° setting would start at 195°. Such performance was achieved with a heater control apparatus 10 having these parts values:

| Part | Value |
| --- | --- |
| Resistor 13 | 6.49 K ohms |
| Resistor 14 | 6.19 K ohms |
| Resistor 16 | 1.43 K ohms |
| Sensor 17 | 100 ohms (0° C.) to 205 ohms (300° C.) |
| Potentiometer 20 | 1.33 to 1.53 K ohms |
| Resistor 21 | 100 ohms |
| Resistor 22 | 49.9 K ohms |
| Resistor 23 | 49.9 K ohms |
| Resistor 23a | 309 K ohms |
| Resistor 25 | 309 K ohms |
| Capacitor 26 | .01 Mf |
| Potentiometer 27 | 6.59 K ohms |
| Resistor 32 | 1 K ohm |
| Resistor 33 | 1 K ohm |
| Potentiometer 36 | 0–10 K ohms |
| Potentiometer 37 | 0–2 K ohms |
| Capacitor 42 | .047 Mf |
| Resistor 44 | 100 K ohms |
| Resistor 45 | 150 K ohms |
| Resistor 46 | 150 K ohms |
| Resistor 47 | 1.5 M ohms |
| Resistor 48 | 51 K ohms |
| Resistor 51 | 20.7 K ohms |
| Resistor 52 | 85.6 K ohms |
| Resistor 54 | 39 K ohms |
| Resistor 55 | 11 K ohms |
| Resistor 56 | 51 K ohms |
| B+ | 7 volts |
| B− | −10 volts |

With these values, the generator 40 produced an isosceles triangular wave extending between −8.5 volts and −2 volts at a frequency of 10 Hz. The peak-to-peak amplitude of the wave form 57 at the 0° set point was about 0.1 volt, and was about 0.01 volt at the 250° set point.

The foregoing description is in respect to an embodiment of the invention whereby the variable proportioning control apparatus is used to control the temperature of an oven chamber. It is to be understood, however, that the apparatus has wider applicability and can control other characteristics of the gas in the chamber. For example, the carbon dioxide content or other ingredients in the gas can be controlled in a similar way. Also, as a further example, relative humidity of the chamber may be controlled.

What has been described, therefore, is an improved variable proportioning control apparatus in which the heating elements, for example, are intermittently energized as the temperature of the chamber approaches the desired temperature. The starting point of such intermittent operation varies in accordance with the desired temperature so that at a relatively low desired temperature, intermittent operation is substantially below the desired temperature, while at higher desired temperatures, intermittent operation starts at a temperature much nearer such desired temperature.

I claim:

1. Variable proportioning control apparatus for controlling a device which varies the magnitude of a given characteristic of gas in a chamber, comprising a comparator having an output for operating the device and having first and second inputs, first means for providing a first electrical signal representative of the actual magnitude of the given characteristic of the gas in the chamber and being coupled to said first input, second means for providing a second electrical signal representative of the desired magnitude of the given characteristic of the gas in the chamber and being coupled to said second input, third means for modulating said second electrical signal with a triangular wave, and fourth means for varying the amplitude of said triangular wave in accordance with the desired magnitude of the given characteristic of the gas in the chamber.

2. The variable proportioning control apparatus of claim 1, wherein the characteristic is the temperature of the gas, and said device is a heating means.

3. The variable proportioning control apparatus of claim 2, wherein said first means includes a constant current source and a temperature sensor having a resistance which varies in accordance with temperature, said sensor being adapated to be positioned in the chamber and being coupled to said constant current source to receive current therefrom.

4. The variable proportioning control apparatus of claim 3, wherein said first means includes a further comparator having a pair of inputs, a temperature sensor having a resistance which varies in accordance with temperature and being adapted to be located in the chamber, a first current source for delivering a constant current to said temperature sensor, the voltage across the said temperature sensor being coupled to one of the inputs of said further comparator, resistor means exhibiting a resistance at a predetermined starting temperature substantially equal to the resistance of said temperature sensor at such temperature, a second constant current source coupled to said resistor means for delivering constant current thereto, the voltage across said resistor means being coupled to the other input of said further comparator, said comparator having an output coupled to the first input of said first-mentioned comparator.

5. The variable proportioning control apparatus of claim 4, and further comprising means for coupling the output of said further comparator to a meter calibrated to indicate the temperature of the chamber.

6. The variable proportioning control apparatus of claim 1 wherein said second means includes a potentiometer and a source follower circuit for coupling said potentiometer to said second input.

7. The variable proportioning control apparatus of claim 1, wherein said triangular wave is isosceles.

8. The variable proportioning control apparatus of claim 1, wherein said triangular wave is truncated to cause the device to stay on for at least a predetermined time once it has been energized.

9. The variable proportioning control apparatus of claim 1, wherein said third means includes a triangular-wave generator and a semiconductor control device having a control electrode coupled to said triangular-wave generator and first and second output electrodes, said first output electrode being coupled to the second input of said comparator and said second output electrode being coupled to said fourth means.

10. The variable proportioning control apparatus of claim 9, wherein said semiconductor control device is a transistor, said control electrode being a base and said first and seocnd output electrodes respectively being a collector and an emitter.

11. The variable proportioning control apparatus of claim 1, being supplied with AC power at a predetermined frequency, wherein the frequency of said triangular wave is less than one-half said predetermined frequency.

12. The variable proportioning control apparatus of claim 1, wherein said frequency of said triangular wave is about 10 Hz.

13. The variable proportioning control apparatus of claim 1, wherein said fourth means includes a substantially linear amplifier having an input coupled to said second means and an input coupled to said third means.

* * * * *

UNITED STATES PATENT AND TRADEMARK OFFICE
CERTIFICATE OF CORRECTION

PATENT NO. : 4,263,501
DATED : April 21, 1981
INVENTOR(S) : Jack L. Wilhelmson

It is certified that error appears in the above-identified patent and that said Letters Patent are hereby corrected as shown below:

[56] Soodak reference date "10/77" should be --11/77--.

Column 1, line 37, "circits" should be --circuits--;

line 40, "become" should be --became--;

line 45, "the" first occurrence should be --that--.

Column 3, line 15, "incorporting" should be --incorporating--.

Column 8, line 54, "seocnd" should be --second--;

line 67, "input" should be --output--.

Signed and Sealed this

Fourteenth Day of July 1981

[SEAL]

Attest:

GERALD J. MOSSINGHOFF

Attesting Officer — Commissioner of Patents and Trademarks